Dec. 8, 1970  J. A. COX, JR., ET AL  3,545,939
CATALYST SYSTEM FOR MAKING HYDROGEN CYANIDE
Original Filed March 30, 1965  4 Sheets-Sheet 1

INVENTORS.
JOHN A. COX, JR.
GEORGE R. GLASER, JR.
MERLYN J. SHOGER
BY Louis Smith
ATTORNEY Dec. 8, 1970   J. A. COX, JR., ET AL   3,545,939
CATALYST SYSTEM FOR MAKING HYDROGEN CYANIDE
Original Filed March 30, 1965                    4 Sheets-Sheet 4

INVENTORS.
JOHN A. COX, JR.
GEORGE R. GLASER, JR.
MERLYN J. SHOGER
BY
ATTORNEY 3,545,939
CATALYST SYSTEM FOR MAKING
HYDROGEN CYANIDE
John A. Cox, Jr., St. Albans, George R. Glaser, Jr., South
 Charleston, and Merlyn J. Shoger, St. Albans, W. Va.,
 assignors to Union Carbide Corporation, a corporation
 of New York
Original application Mar. 30, 1965, Ser. No. 443,838.
 Divided and this application Nov. 8, 1968, Ser. No.
 794,817
Int. Cl. B01j 9/04; C01c 3/02
U.S. Cl. 23—288                                1 Claim

ABSTRACT OF THE DISCLOSURE

An improvement in a catalyst support system for the production of hydrogen cyanide in a conventional reactor comprising supporting platinum-rhodium catalyst layers upon corrugated ceramic support material which consists essentially of about 94 to about 98 weight percent aluminum oxide, the remainder being essentially silicon oxide, and which corrugated ceramic support material contains from about 65 to about 92 percent open area, said catalyst-support system being disposed so as to define a clearance with the inner walls of said heat exchanger, said corrugated ceramic support material being itself supported by pelleted ceramic material and said clearance being filled with pelleted ceramic material at least one layer of which is catalyst coated.

---

This application is a division of application Ser. No. 443,838, filed Mar. 30, 1965 and now abandoned.

This invention has to do with a system for producing hydrogen cyanide from ammonia, natural gas (methane) and air and is particularly related to the catalyst employed therein. More particularly, the present invention is concerned with a highly improved support for the catalyst in this system.

The commercial method of making hydrogen cyanide comprises catalytic conversion of readily available gases which contain hydrogen, carbon and nitrogen. For example, hydrogen cyanide can be produced by reacting ammonia with a hydrocarbon. This reaction is highly endothermic and the resultant heat deficiency must be supplied from some source. One such source is described by Andrussow in U.S. Pat. 1,934,838 wherein the required heat is provided by adding oxygen and an excess of hydrocarbon.

Most generally, hydrogen cyanide is produced commercially by the reaction of ammonia, methane (or natural gas) and oxygen (air) over a catalyst which is preferably one of the platinum metals or an alloy of these metals inter se. The reaction may be represented as follows:

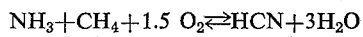

$$NH_3 + CH_4 + 1.5\ O_2 \rightleftarrows HCN + 3H_2O$$

Excess methane and oxygen are employed to provide the necessary heat so as to maintain a reaction temperature of approximately 1100° C. The catalyst is ordinarily supported on a suitable support material which may be completely inert or may itself contain platinized particles.

The above-mentioned reactions may be carried out in a reactor having the general construction of the reactor described in U.S. Pat. 2,782,107. This includes an upright generally cylindrical reactor divided into three main sections. The upper section consists of a conical chamber. This chamber is positioned above a second section which contains a fixed or immobile catalyst, generally in the form of metallic gauze pads supported by a particulate mass or a granular catalyst bed. The conical chamber and the catalyst section are supported by the lowest section of the reactor which is a vertically disposed shell and tube heat exchanger. The heat exchanger possesses a concave top, protected by suitable insulation, upon which rests the catalyst support and the catalyst in open contact with the conical chamber. The present invention is concerned with the second section of such reactor, i.e., the catalyst section, and it is particularly concerned with an improved support system for the catalyst.

Various types of support have heretofore been employed in the commercial production of hydrogen cyanide. A commonly employed catalyst system comprises beryl-supported platinum-rhodium alloy. However, the use of beryl-supported catalyst presents several disadvantages and limitations. These include higher catalyst cost, low efficiency of methane and ammonia to hydrogen cyanide, lower permissible gas flow through the system, lower capacity and decreased productivity of hydrogen cyanide. The term productivity as employed herein denotes pounds per hour of hydrogen cyanide produced per square foot of catalyst surface area.

In an attempt to obviate the disadvantages which are inherent in the use of beryl-supported catalyst at the prevailing operating conditions resort has been made to the use of catalyst in the form of metallic gauze pads. For example, platinum-rhodium gauze pads have been supported directly on beryl support or the gauze pads have been supported upon metallic supports such as Inconel grid, cobalt bars, and the like. However, the use of metallic support has been found to have an adverse effect upon the formation of hydrogen cyanide since most metals favor the decomposition of hydrogen cyanide and ammonia at the prevailing operation conditions. In order to prevent this decomposition the metal support has been ceramically coated. However, rapid changes of temperature during the operation which result from the start-up and shut-down of the reactor cause differential expansion and contraction in the ceramically-coated metal and thus failure of the metal-ceramic bond. Consequently, the metal is exposed to the reactants causing the decomposition of hydrogen cyanide and ammonia in the manner indicated above. Furthermore, most metals are susceptible to creep and mechanical deterioration or failure at the prevailing temperatures.

Another serious difficulty with most of the support systems which have heretofore been employed involves the loss of catalyst at the walls of the reactor which results in considerable by-pass of gaseous materials. It is therefore imperative that the catalyst edges be adequately sealed at the reactor wall to insure against such passage of gases. Failure to adequately seal the edges results in losses of platinum by the formation of platinum carbide.

The present invention contemplates obviating the foregoing difficulties which have heretofore been experienced with the support systems employed in the catalyst section of the reactor. This is accomplished by supporting the platinum-rhodium gauze catalyst upon an improved support material in the manner described hereinafter particularly in connection with the drawings. The use of the improved support and the arrangement of the catalyst system in the catalyst section of the reactor as practiced herein insures adequate edge sealing, reduces or substantially eliminates the problem of platinum losses from the catalyst, eliminates the tendency of decomposition of hydrogen cyanide and ammonia and results in greater efficiency and productivity. The improved catalyst system is described and will be more clearly understood in connection with the attached drawings wherein:

Figures 1, 2:
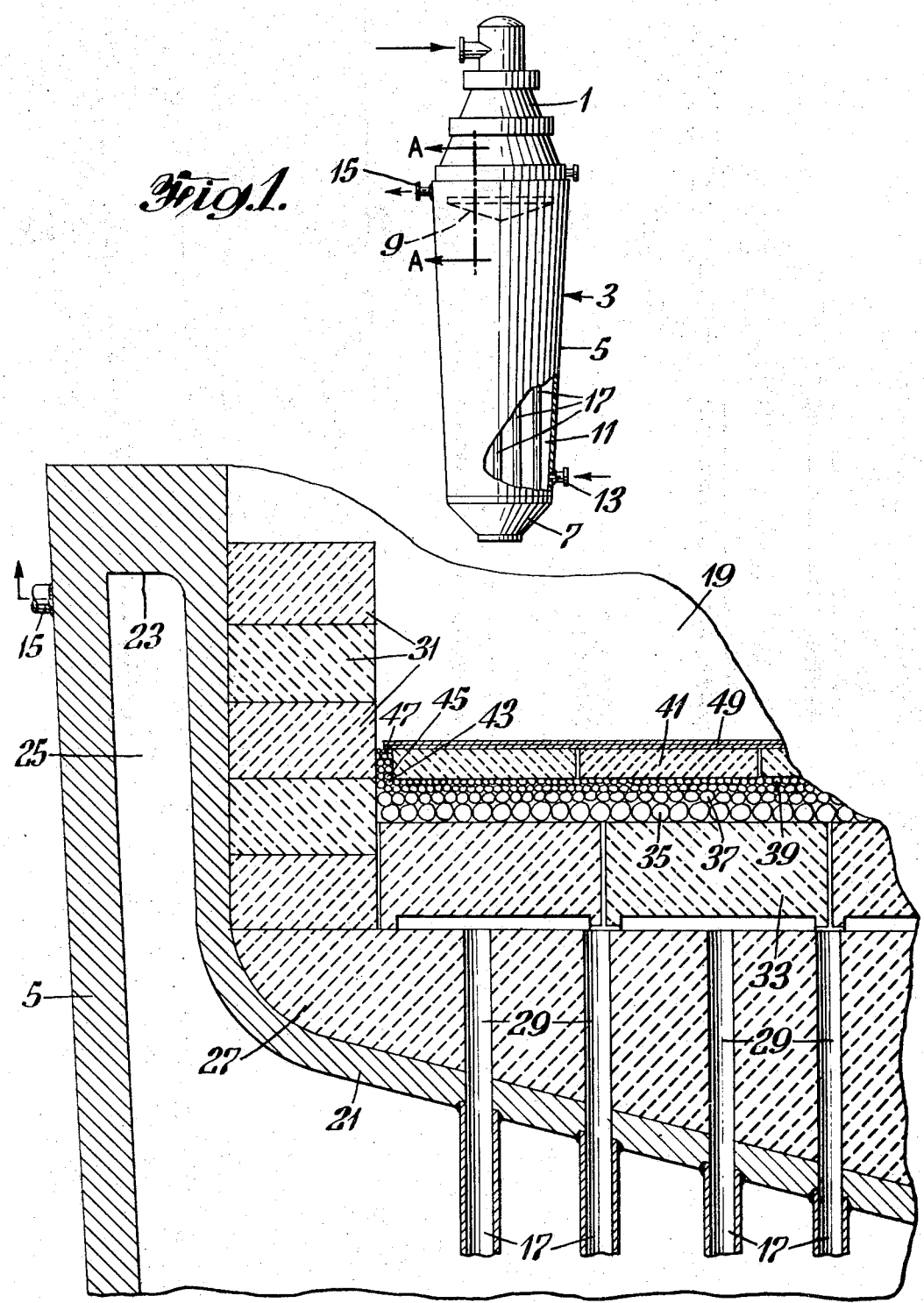
FIG. 1 is an elevation, partly in section, of a reactor which is employed for the production of hydrogen cyanide by the reaction described hereinabove.
FIG. 2 is an enlargement of that section of FIG. 1 which is designated by the line A—A and showing the arrangement of the catalyst and the support in the catalyst section.

Referring now to FIGS. 1 and 2, there is shown a hollow conical section 1 supported by heat exchanger 3 which is in the general form of a substantially closed hollow cylinder having an external wall 5, a base 7 and a top 9. Within the heat exchanger 3 is located chamber 11 which has a lower water inlet 13 and an upper liquid or vapor outlet 15. Chamber 11 also contains a plurality of tubes 17 which vertically pass through said chamber and join top 9 and open in the space above the top as shown in FIG. 2.

Top 9 defines a relatively short reentrant cylinder 19 which has a smaller diameter than but is coaxial with cylindrical wall 5 of heat exchanger 3 and has a length serving as a tube sheet 21 substantially closing the lower end of the reentrant cylinder 19 and extending convexly into steam chamber 3 and a flat annulus 23 joining the upper end of cylinder 19 integrally with the wall 5 of heat exchanger 3. An annular space 25 is defined by top 9, annulus 23 and wall 5 of heat exchanger 23. Annular space 25 serves to cool cylinder 19. Tube sheet 21 may have been any one of several configurations. It may be an inverted cone, a spherical segment or any other geometrical figure that can prevent accumulation of steam or noncondensable gases which may insulate the tube sheet from the cooling effect of water.

Disposed above tube sheet 21 of heat exchanger 3 is sillimanite refractory 27 which serves to protect the tube sheet from the high reaction temperature. Refractory 27 may be either precast and cemented to tube sheet 21 or formed in situ. In either case, tubes 29, aligned with tubes 17 extend vertically through the sillimanite refractory 27 and provide for unobstructed passage of product gases.

Conical section 1 is removably connected to heat exchanger 3 in any suitable manner. Sillimanite refractory bricks 31 insulate the walls of reentrant cylinder 19 and extend downwardly to the upper level of the sillimanite refractory 27 and upwardly just below the base of conical section 1 or even slightly above to afford said conical section some protection against the high temperatures generated in the catalyst section.

As previously indicated, this invention is primarily directed to the use of an improved support material in the catalyst section and to the arrangement of the catalyst and the support in this section. The first layer of the catalyst support consists of slotted sillimanite grid tiles 33 which contain one or more rows of preferably equidistantly spaced slots extending vertically through said grid tiles and insuring adequate and even distribution of the gases to heat exchanger 3. Of course grid tiles of various size can be employed and the number and arrangement of the slots therein can be varied to adapt to any given operation. Sillimanite grid tiles of 7½ inches x 7½ inches x 3 inches with two rows of slots ½ inch wide and 2½ inches long have been efficaciously employed in one operation. Other sizes and arrangement may be equally adaptable and efficacious for this purpose.

The sillimanite grid tiles 33 support a bed of graded pellets consisting of several layers of pelleted ceramic material. For example, in the embodiment shown in FIG. 2, the sillimanite grid tiles 33 support a layer 35 of ⅝ x ⅝ inch pellets upon which rests another layer 37 of ⅜ x ⅜ inch pelleted materials. Finally, one or more layers 39 of ¼ x ¼ inch pelleted materials rest upon layer 37 as shown in FIG. 2. It is understood of course that the gradation of the pellets, their form and the number of layers can be varied by those skilled in the art to be particularly suitable for the contemplated operation.

Above layer 39 of said bed of graded pellets rests a corrugated ceramic support material 41 known as Thermacomb Corrugated Ceramic, hereafter referred to as Thermacomb.

Figure 5:
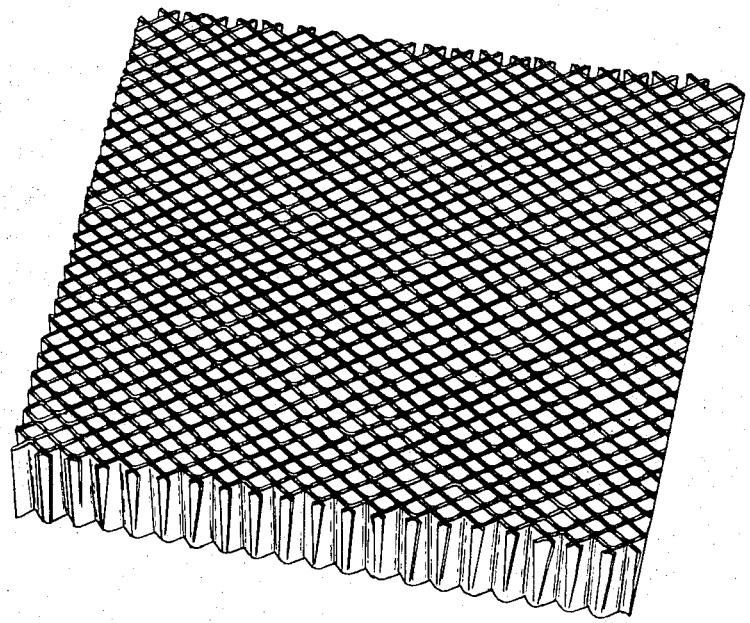
FIG. 5 shows one particular design of the improved support material that can be employed in this invention.

Although FIG. 5 shows one particular design and configuration for the Thermacomb support, i.e., one having crisscross honeycomb design, there are several other configurations and designs which are equally efficacious. These include such structures as cross flow split cell, crisscross plit cell and crisscross honeycomb with different external configuration than that shown in FIG. 5.

The Thermacomb support layer 41 can be positioned so as to define some clearance with the refractory brickwork 31 and the periphery of the Thermacomb support layer 41, or it can be tightly fitted against the wall of brickwork 31. The clearance can vary from about a few tenths of an inch to about one inch. The area defined by this clearance (FIG. 2) extends downwardly to layer 39 and is filled with a bottom layer 43 of ceramic pellets, a second layer 45 resting upon said layer 43 and also consisting of ceramic pellets and a top layer 47 of beryl-supported platinum catalyst.

Several layers of platinum-rhodium gauze pads 49 are supported by the Thermacomb support 41. The gauze pads 49 extend laterally into the said clearance defined by Thermacomb layer 41 and the walls of brickwork 31 and are fitted so as to overlap the beryl-supported catalyst 47 in said clearance. In practice the catalyst consists of approximately 90% platinum and 10% rhodium. The number of layers in the gauze pads and the composition of the alloy catalyst can be varied, if desired, to vary the conversion to hydrogen cyanide.

In operation, natural gas or methane, air and ammonia are introduced into the conical section 1 and forced downwardly through the catalyst bed and ignited. Once initiated, the reaction is self-sustaining and the reaction temperature is maintained at about 1100° C. The gaseous product and the unconverted gases pass through the several layers of the catalyst and the supports and are conducted through tubes 29 into tubes 17 of heat exchanger 3. Hydrogen cyanide is then recovered from the product gas leaving heat exchanger 3 in a manner which is generally known in the art.

The use of Thermacomb support and the arrangement of the catalyst section herein result in several improvements in the process. As previously indicated the decomposition of hydrogen cyanide and ammonia is virtually eliminated, the loss of platinum from the catalyst is effectively reduced or eliminated. Furthermore, the present system provides an effective seal between the periphery of the catalyst bed and the wall of brickwork 31 so that there is practically no gas by-passing around the catalyst bed.

The Thermacomb support employed herein contains from about 65 to about 92 percent open area, preferably from about 75 to about 85 percent open area. It therefore eprmits ready flow of gaseous materials across the support with very little pressure differential. In contrast, the pressure differential associated with the flow of gaseous materials through the bed of graded pellets and the beryl-supported platinum-rhodium catalyst is considerably higher than the pressure differential across the Thermacomb support and he pellet beds. It is an elementary principle of fluid flow that the fluid always follows the path of least resistance. Thus referring to FIG. 2 the gases flowing through the clearance defined by the periphery of the catalyst bed and brickwork 31 encounter greater resistance in comparison with the resistance encountered by the gases flowing through the Thermacomb support. Consequently, the tendency of by-passing is minimized since essentially all the gaseous material will flow through the Thermacomb support.

The Thermacomb support material consists of from about 94 to about 98 percent $Al_2O_3$, the remainder, i.e., from about 2 to about 6 percent, being essentially silicon oxide ($SiO_2$). A particularly advantageous composition is one consisting of about 96 percent $Al_2O_3$, the remainder being essentially silicon oxide.

The ceramic pellets supported by the sillimanite grid tiles consists of from about 60 to about 98 percent $Al_2O_3$, the remainder being essentially silicon oxide. A particularly desirable composition is one consisting of about 96 percent $Al_2O_3$, the remainder being essentially silicon oxide.

The sillimanite grid tiles consist of from about 60 to about 90 percent $Al_2O_3$, from about 5 to about 35 percent $SiO_2$ and the remainder being $TiO_2$, $FeO_2$, $CaO$, $MgO$ and other alkaline oxides. One particularly advantageous composition consists of about 69 percent $Al_2O_3$, 25 percent $SiO_2$, about 2.5 percent $TiO_2$, about 1.8 percent $FeO_2$ and about 0.5 percent $CaO$, $MgO$ and other alkaline oxides.

The supported-catalyst system described herein is fixed bed rather than fluidized bed. Its applicability is not necessarily limited to the production of hydrogen cyanide by the previously-described reactions but may be effectively employed in other vapor-phase reactions. Such reactions may include the conversion of methane to formaldehyde, the isomerization and cracking of hydrocarbons, the steam conversion of methane to synthesis gas, the conversion of carbon monoxide and steam to carbon dioxide and hydrogen, chlorination, dichlorination, the oxidation of ammonia and many other reactions.

Figure 3:
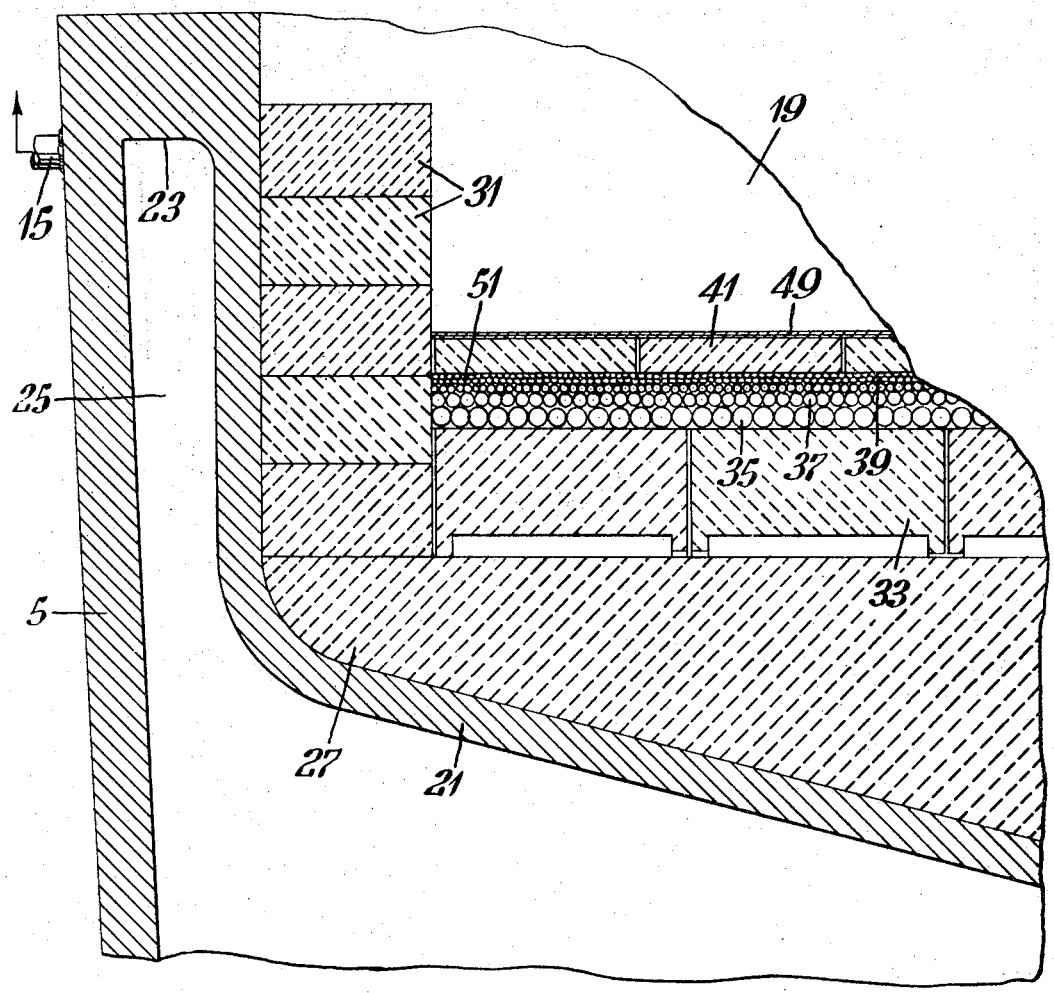
FIG. 3 illustrates a different embodiment of the invention with regard to the arrangement in the catalyst section shown in FIG. 2.

The present invention contemplates several modifications of the arrangement of the catalyst and the Thermacomb support in the catalyst section. One such modification is illustrated by FIG. 3 wherein the support and the platinum-rhodium gauze pads are extended laterally so as to fit tightly against the wall of brickwork 31. One or more layers 51 of beryl-supported platinum-rhodium catalyst replace said layer 39 for a distance of about 1 to about 2 inches laterally extending away from the wall of brickwork 31. This may be a layer of beryl-supported platinum-rhodium (90% platinum and 10% rhodium) catalyst.

Figure 4:
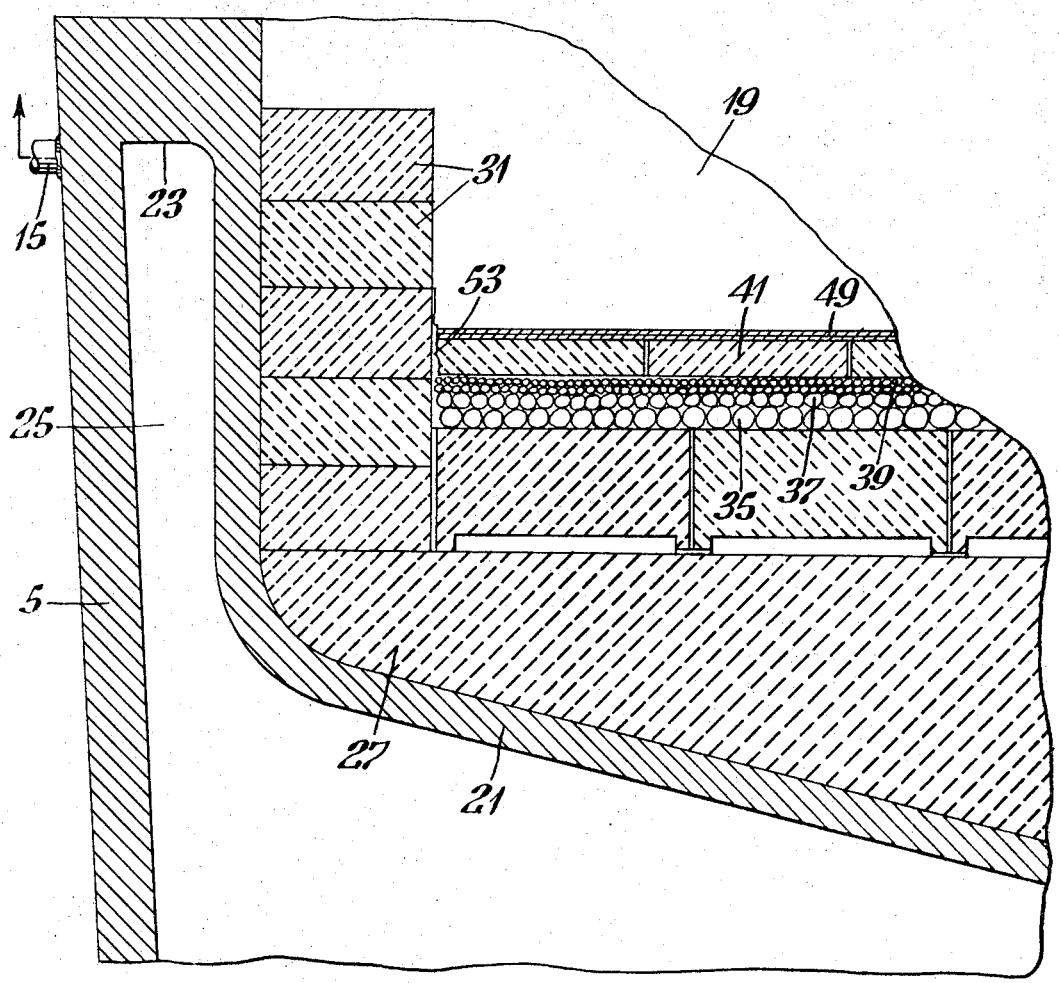
FIG. 4 is a further modified arrangement of the catalyst section which is shown in FIG. 2.

Another modified arrangement is shown in FIG. 4. This arrangement is very smilar to the arrangement shown in FIG. 3. The support 41 and the catalyst gauze pads 49 are laterally extended to the edge of brickwork 31. The Thermacomb support 41 is cemented to the brickwork 31. The platinum-rhodium catalyst gauze pads overlap the cement seal thus forming a seal between the support and the brickwork 31.

Another modification of this invention contemplates substituting ceramic bar supports for the bed of graded pellets. Thus the Thermacomb may be supported by a plurality of regularly spaced ceramic bars.

The advantages resulting from the use of Thermacomb support and the arrangement in the catalyst section which is described herein become evident from the following comparative description.

Utilizing the reactor illustrated in FIG. 1 and employing the conventional beryl-supported catalyst as hereinbefore described, ammonia, methane and air at the molar feed ratio of 1:1.5:8 were fed to the reactor. The conversion to hydrogen cyanide was effected at a reaction temperature of 1100° C. The ammonia and methane efficiencies were 68 percent and 32 percent, respectively. Only 50 to 70 percent of the platinum catalyst initially charged could be recovered, the remainder was lost due to platinum carbide formation. Furthermore, the catalyst required reactivation after 50 days of operation.

In the same reactor described above but employing the catalyst system described in FIG. 2 (Thermacomb supported catalyst), ammonia, methane and air were fed to the reactor at the molar feed ratio of 1:1.25:7.0. The feed rates and other reaction conditions were essentially the same as described above. The ammonia and methane efficiencies were determined to be 75 and 45 percent, respectively, and the production of hydrogen cyanide was increased by about 25 percent as compared to the beryl-supported system. The metal recovery was about 97 percent with essentially no platinum carbide formation. The catalyst life was also increased to about 120 days.

What is claimed is:

1. In an improved catalyst-support system for the production of hydrogen cyanide by the reaction of natural gas, ammonia and air in a reactor having a generally cylindrical configuration which comprises a cylindrical heat exchanger with a bottom collecting section, a conical gas mixing chamber joined in the top to said heat exchanger, an immobile bed of platinum-rhodium supported catalyst at the top of said heat exchanger and exposed to said conical gas mixing chamber, the improvement which comprises supporting platinum-rhodium catalyst layers upon corrugated ceramic support material which consists essentially of about 94 to about 98 weight percent aluminum oxide, the remainder being essentially silicon oxide, and which corrugated ceramic support material contains from about 65 to about 92 percent open area, said catalyst-support system being disposed so as to define a clearance with the inner walls of said heat exchanger, said corrugated ceramic support material being itself supported by pelleted ceramic material and said clearance being filled with pelleted ceramic material at least one layer of which is catalyst coated.

References Cited
UNITED STATES PATENTS

| | | | |
|---|---|---|---|
| 2,782,107 | 2/1957 | Inman | 23—288 |
| 2,969,318 | 1/1961 | Woodall | 23—288X |
| 3,423,185 | 1/1969 | Ballard et al. | 23—288 |

JOSEPH SCOVRONEK, Primary Examiner

U.S. Cl. X.R.

23—151; 48—196